(12) United States Patent
Marchal

(10) Patent No.: US 9,410,257 B2
(45) Date of Patent: Aug. 9, 2016

(54) TUBULAR ELECTROCHEMICAL CELL

(75) Inventor: Frederic Marchal, Sheffield (GB)

(73) Assignee: ITM POWER (RESEARCH) LIMITED, Sheffield, South Yorkshire (GB)

(*) Notice: Subject to any disclaimer, the term of this patent is extended or adjusted under 35 U.S.C. 154(b) by 330 days.

(21) Appl. No.: 13/392,951

(22) PCT Filed: Sep. 15, 2010

(86) PCT No.: PCT/GB2010/051548
§ 371 (c)(1),
(2), (4) Date: Apr. 18, 2012

(87) PCT Pub. No.: WO2011/033299
PCT Pub. Date: Mar. 24, 2011

(65) Prior Publication Data
US 2012/0193242 A1    Aug. 2, 2012

(30) Foreign Application Priority Data
Sep. 16, 2009  (GB) .................................. 0916179.5

(51) Int. Cl.
C25B 9/08 (2006.01)
C25B 9/18 (2006.01)
C25B 9/10 (2006.01)
H01M 8/00 (2016.01)
H01M 8/10 (2016.01)
H01M 8/24 (2016.01)
C25B 1/12 (2006.01)

(52) U.S. Cl.
CPC ... C25B 9/10 (2013.01); C25B 9/08 (2013.01); C25B 9/18 (2013.01); H01M 8/004 (2013.01); H01M 8/1004 (2013.01); H01M 8/241 (2013.01); H01M 2008/1095 (2013.01); Y02E 60/521 (2013.01)

(58) Field of Classification Search
USPC .......................................................... 204/260
See application file for complete search history.

(56) References Cited

U.S. PATENT DOCUMENTS 4,879,016 A * 11/1989 Joshi .............................. 204/242
4,957,673 A *  9/1990 Schroeder et al. ............. 264/643
6,001,500 A   12/1999 Bass et al.
6,060,188 A *  5/2000 Muthuswamy et al. ....... 429/494
7,837,842 B1* 11/2010 Mayers et al. ................. 204/266

(Continued)

FOREIGN PATENT DOCUMENTS

EP    1528126 A1   4/2005
EP    2040324 A1   3/2009
EP    2086041 A1   5/2009
TW  200847509 A   12/2008

(Continued)

OTHER PUBLICATIONS

Database WPI, "Electrode structure for fuel cell," Accession No. 2009-L12954, Dec. 1, 2008.

*Primary Examiner* — Harry D Wilkins, III
(74) *Attorney, Agent, or Firm* — Saliwanchik, Lloyd & Eisenschenk

(57) ABSTRACT

A membrane electrode assembly (MEA) comprises substantially concentric and tubular-shaped layers of a cathode, an anode and an ion-exchange membrane. The MEAs of the invention can be used in an electrochemical cell, which comprises the following layers which are tubular-shaped, arranged substantially concentrically, and listed from the inner layer to the outer layer; (i) a cylindrical core; (ii) one of the electrodes; (iii) a membrane; (iv) the other of the electrodes; and (v) an outer cylindrical sleeve.

18 Claims, 15 Drawing Sheets

(56) References Cited

U.S. PATENT DOCUMENTS

| | | | | |
|---|---|---|---|---|
| 2001/0050234 A1* | 12/2001 | Shiepe | ............ | 205/629 |
| 2004/0023101 A1* | 2/2004 | Jacobson et al. | ............ | 429/38 |
| 2008/0264781 A1 | 10/2008 | Iltsenko et al. | | |

FOREIGN PATENT DOCUMENTS

| | | |
|---|---|---|
| WO | WO 01/47054 A1 | 6/2001 |
| WO | WO 02/084763 A1 | 10/2002 |
| WO | WO 2005/122303 A2 | 12/2005 |

* cited by examiner

SECTION K-K

SECTION J-J

TOP VIEW

SECTION L-L

Figure with flow arrows.

ISOMETRIC VIEW SHOWING MEA ONLY WITH ANODE CURRENT ROUTING SOLUTION (MALE INTERFACE END)

TUBULAR ELECTROCHEMICAL CELL

CROSS REFERENCE TO A RELATED APPLICATION

This application is a National Stage Application of International Application Number PCT/GB2010/051548, filed Sep. 15, 2010; which claims priority to Great Britain Application No. 0916179.5, filed Sep. 16, 2009; both of which are incorporated herein by reference in their entireties.

FIELD OF THE INVENTION

This invention relates to the composition and configuration of electrochemical cells.

BACKGROUND OF THE INVENTION

An example of an electrochemical cell is an electrolyser. In electrolysers, electrical energy is supplied to water to produce hydrogen and oxygen by electrolysis. The electrolyser may contain a solid polymeric electrolyte or a liquid electrolyte.

Electrolysers are employed to produce hydrogen and/or oxygen for various applications, ranging from laboratory gas supplies to refuelling hydrogen-powered vehicles. Electrolysers are usually rated by gas purity and the rate of gas delivery.

A conventional (planar) solid polymer electrolyser consists of a number of cells, each comprising a polymeric membrane (for ion transfer and for separating the oxygen and gas evolution reactions), and two electrodes per cell for providing the electron conduction paths. The electron transfer, ion transfer and gas evolution processes are characterised by "overvoltages" (inefficiencies), and these result in heat generation. Thus heat extraction from the active surfaces of each cell is essential in order to keep the cell temperature below its maximum safe operating temperature.

Conventionally, forced convection cooling of one or both surfaces of each cell is achieved by re-circulating the water used for electrolysis in a pumped thermal circuit employing a heat exchanger for transferring heat to the surroundings. As the water/gas mixture emerges from the electrolyser cells, the gas needs to be separated (usually by means of a separating tower) before water can be returned to the cell(s). (An electrolyser which circulates water on both sides of the membrane requires two thermal circuits with associated pumps, heat exchangers and separating towers). Also water is consumed (due to electrolysis) on the oxygen side, and transmitted by electro-osmosis through the membrane from the oxygen side to the hydrogen side.

These heat generation, water transfer and gas/water separation processes must therefore be managed appropriately during the operation of an electrolyser. This requires a significant set of 'balance of plant' (BoP) technologies, which tends to make an electrolyser system complex and expensive.

Good electrical contact is maintained in conventional planar electrolysers by the use of tie rods and stiffened bulky end plates to pressurise the membrane electrode assembly (MEA). This leads to uneven pressure in the MEA and bending stresses. Also, when planar electrolysers are arranged in a stack, it is necessary to maintain sufficient pressure and a good electrical contact between end plates. This leads to further compressive stresses, which can cause failure of the cell.

A significant problem also exists with the servicing of planar electrolysers in a stack. As there are multiple tie-rods and nuts in a stack, a great deal of work has to be done in order to service all of the cells within the electrolyser, and the servicing on one cell can impact on the contacts within all the other cells.

SUMMARY OF THE INVENTION

The present invention is based on the realisation that a tubular/cylindrical membrane electrode assembly (MEA) has many benefits. Those benefits include reduced bending stresses in end plates (or interfaces between cells in a stack), uniform pressure throughout the MEA, improved heat extraction, ease of servicing of cells and MEAs within a stack, reduced sensitivities to components and assembly tolerances.

According to a first aspect of the present invention, a membrane electrode assembly (MEA) comprises substantially concentric and tubular-shaped layers of a cathode, an anode and an ion-exchange membrane.

According to a second aspect, an electrochemical cell comprises the following layers which are tubular-shaped, arranged substantially concentrically, and listed from the inner layer to the outer layer;
  (i) a cylindrical core;
  (ii) one of the electrodes;
  (iii) a membrane;
  (iv) the other of the electrodes; and
  (v) an outer cylindrical sleeve.

According to a third aspect, a stack comprises a plurality of cells as described above, arranged end-to-end, such that they are connected via the interfaces.

According to a fifth aspect, a tubular vessel contains a cell, or a stack of cells, as described above.

According to a sixth aspect, the present invention is a method of performing an electrochemical reaction involving a liquid and a gas, using a tubular vessel according to any of claims 16 to 18, wherein the liquid and gas are separated passively within the tubular vessel, such that no additional gas/liquid separation tower is needed in order to perform the electrochemical reaction.

DESCRIPTION OF THE PREFERRED EMBODIMENTS

Figure 1:
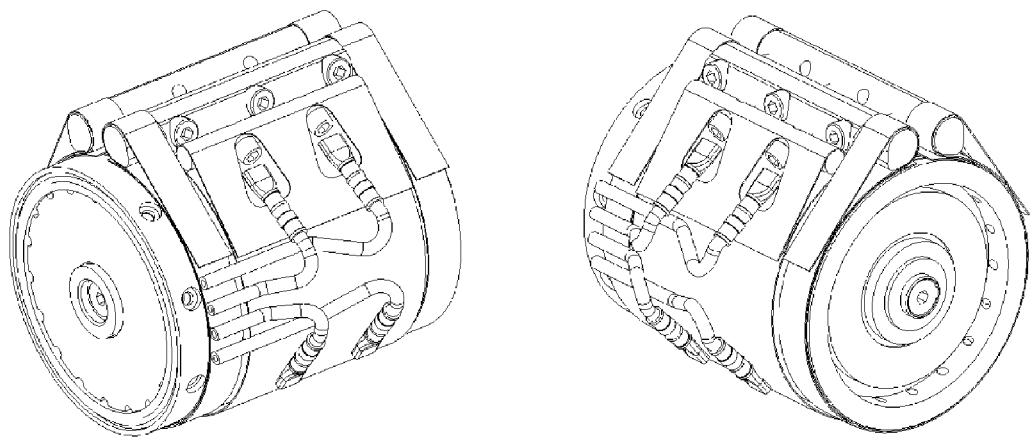
FIG. 1 is a 3-dimensional representation of an electrochemical cell of the invention.
Figure 2:
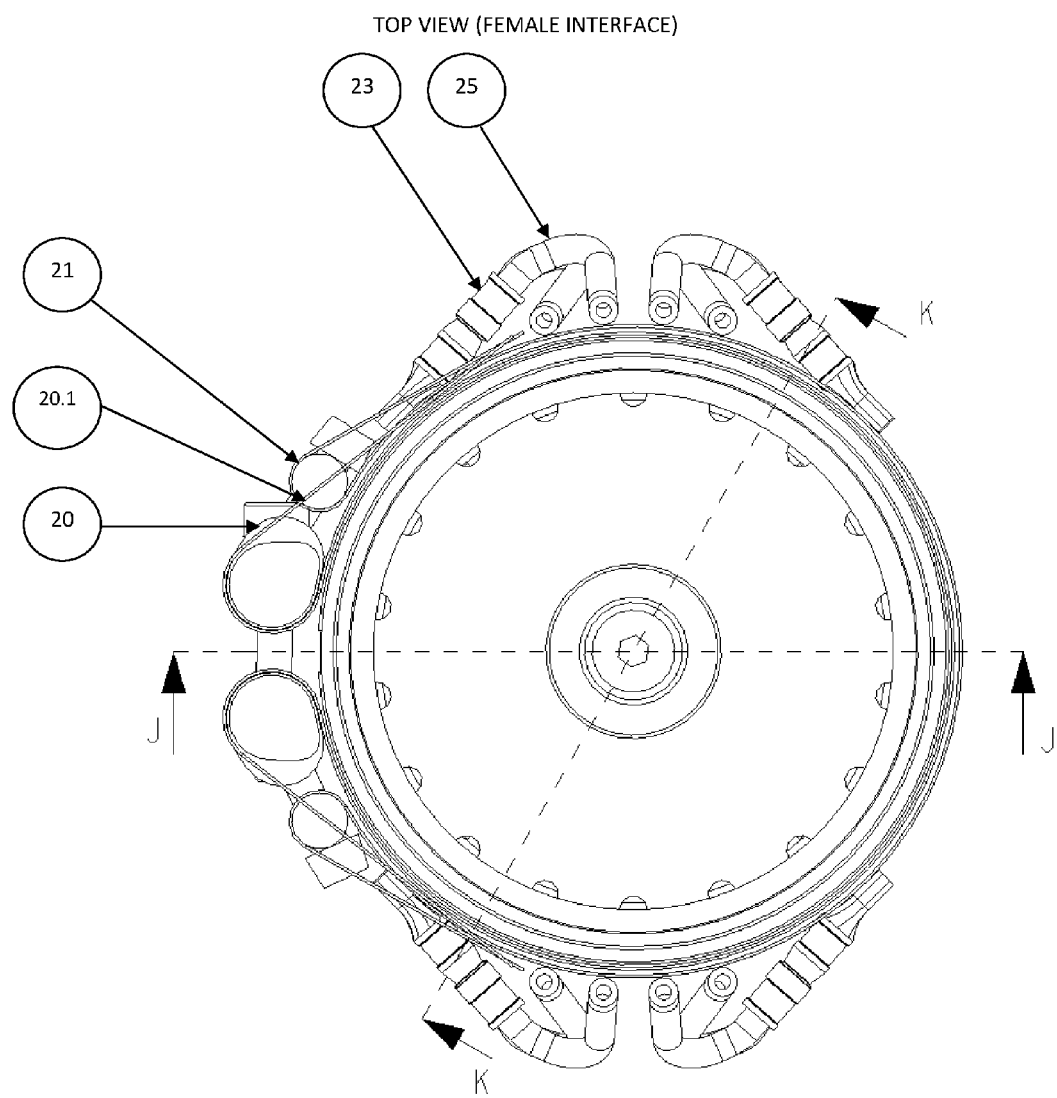
FIG. 2 is a top view (female interface) of a cell embodying the invention.
Figure 3:
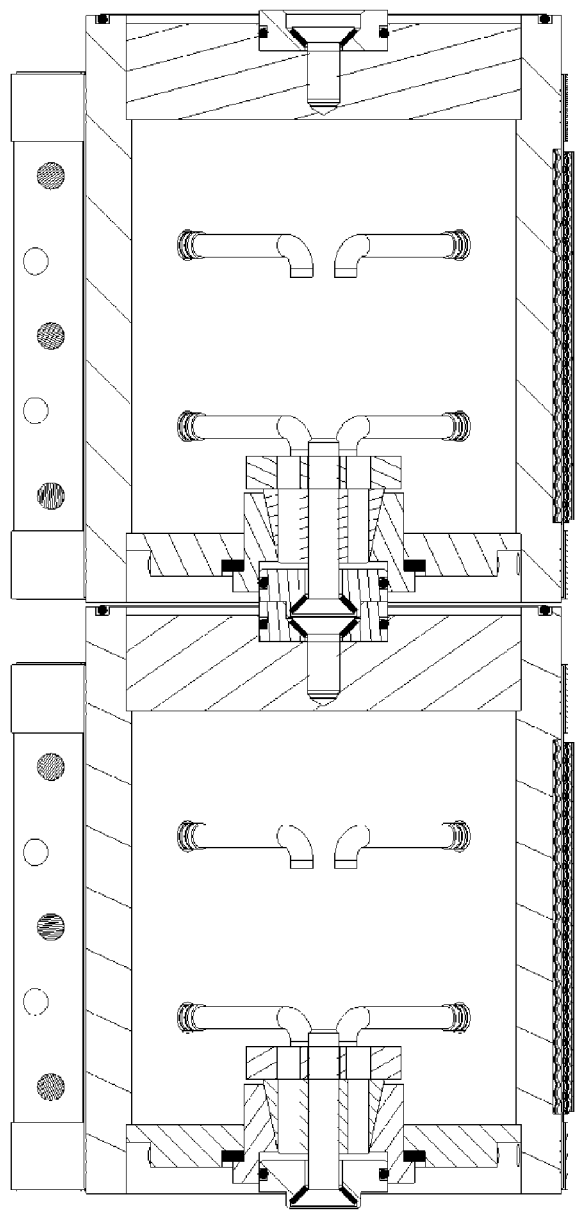
FIG. 3 is a cross section side view of a stack of two tubular cells embodying the invention.
Figure 4:
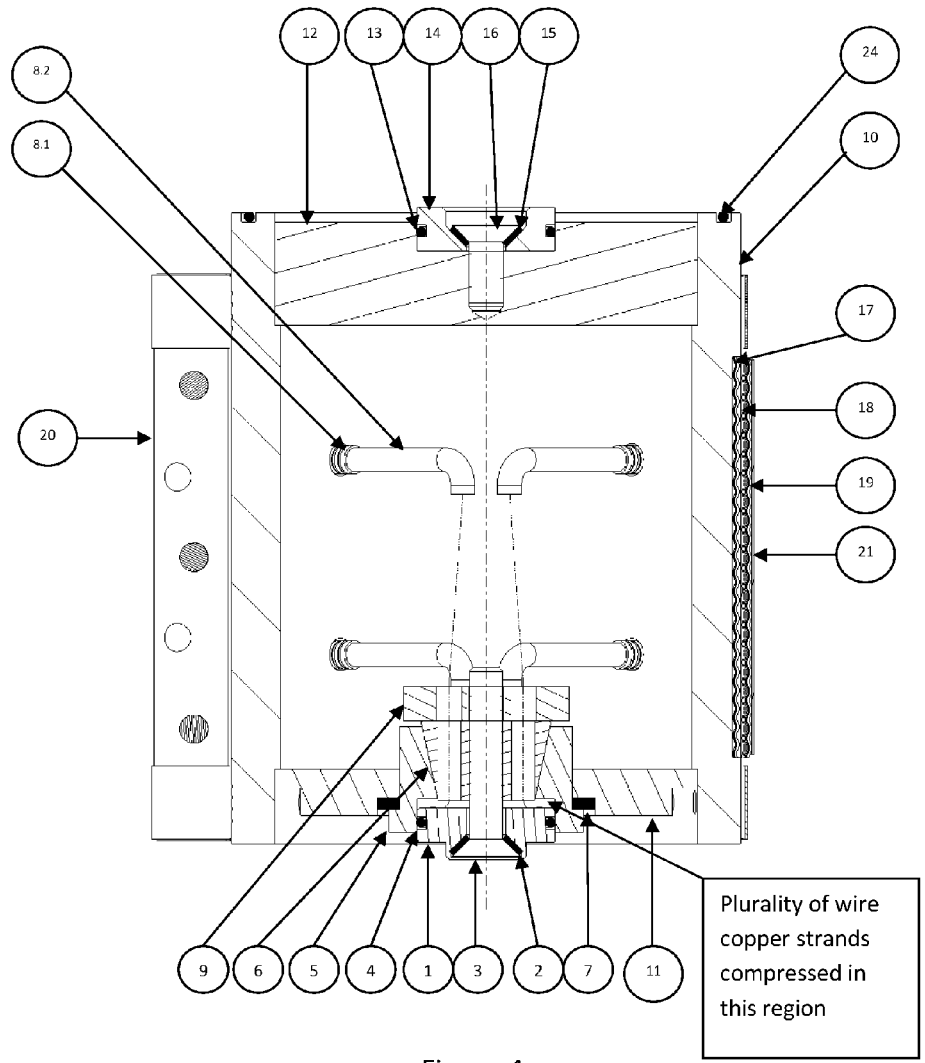
FIG. 4 is a cross section of single cells as in FIG. 3.
Figure 5:
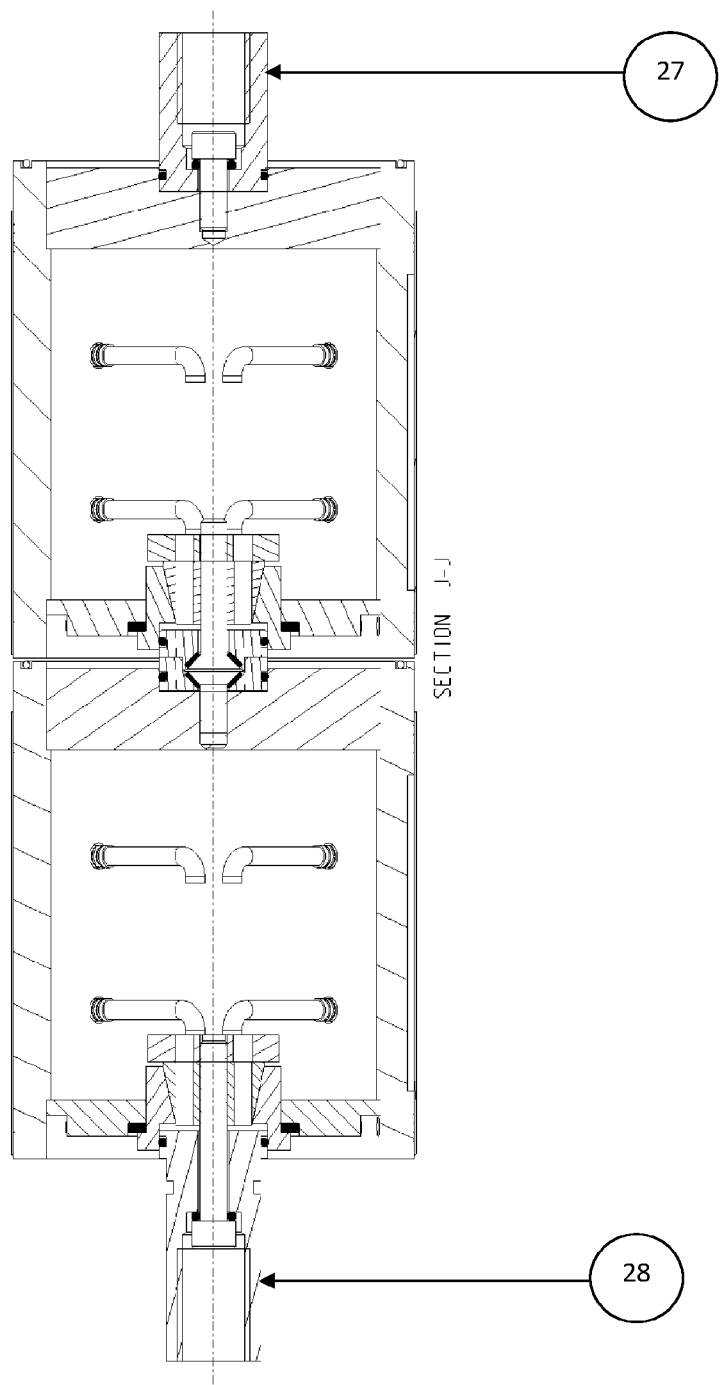
FIG. 5 is a side view of the uppermost and lowermost cells in a stack embodying the invention.
Figure 6:
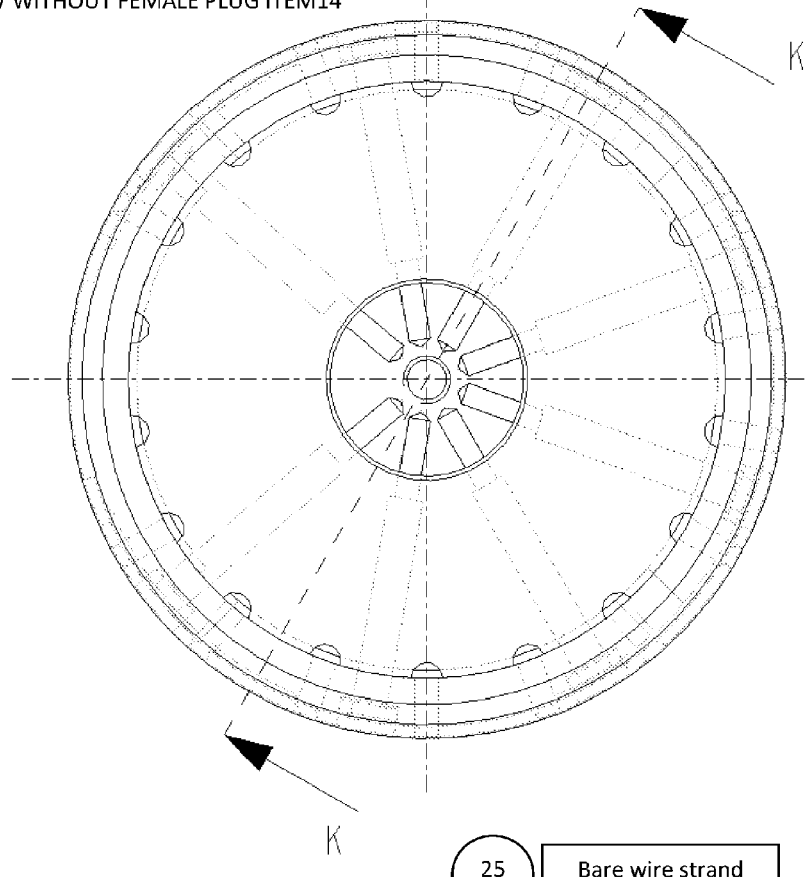
FIG. 6 is a top view (female plug (14) not shown) of a cell of the invention.
Figure 6:
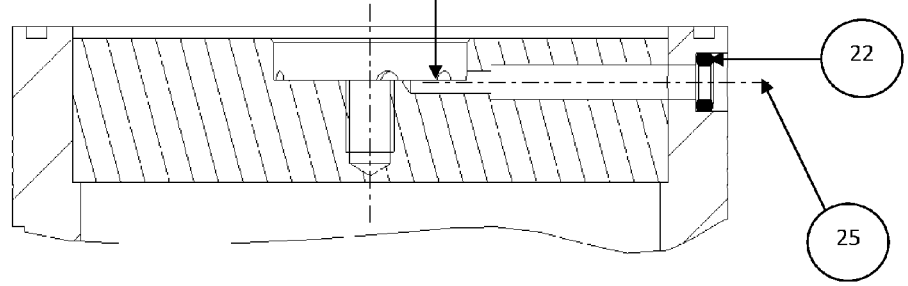
Figure 7:
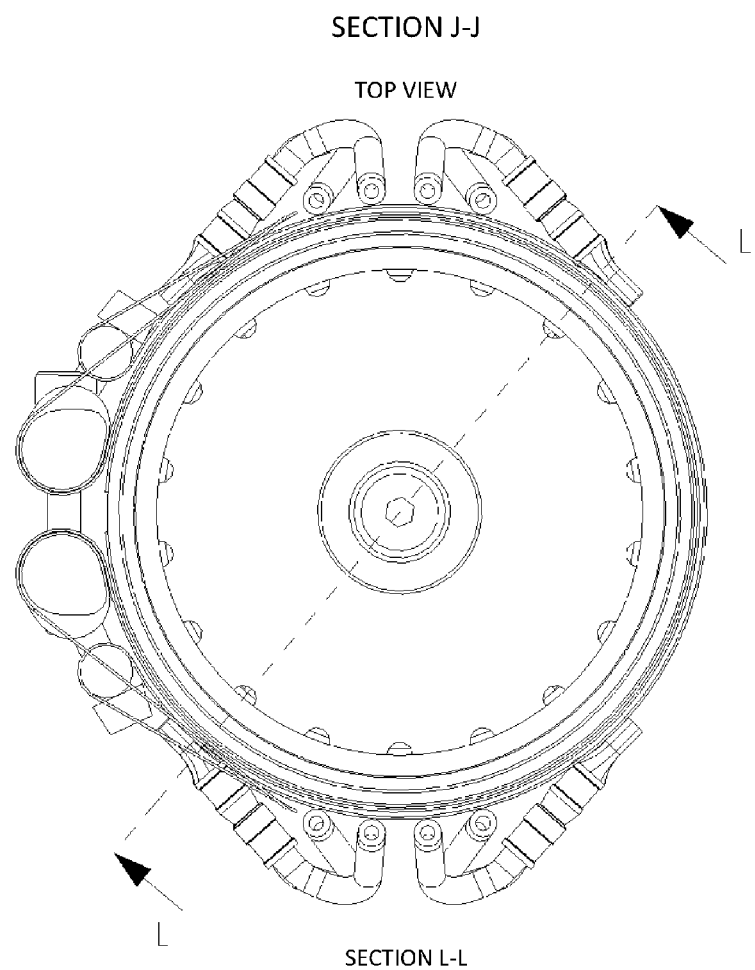
FIG. 7 is another top view of a cell of the invention.
Figure 7:
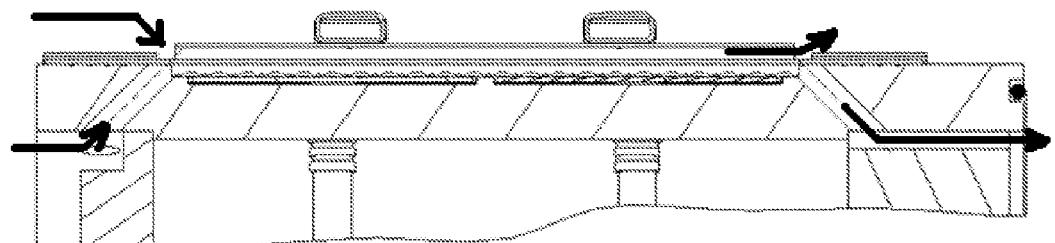
Figure 8:
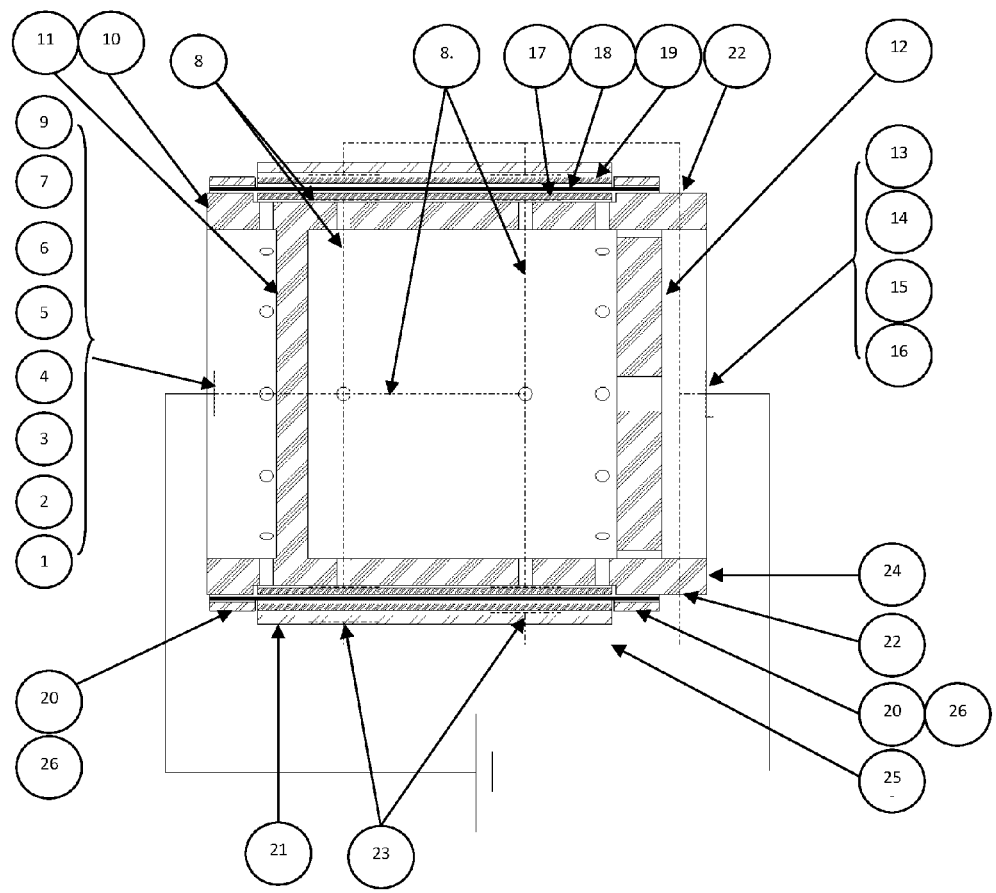
FIG. 8 is a generic side view of a cell of the invention.
Figure 9:
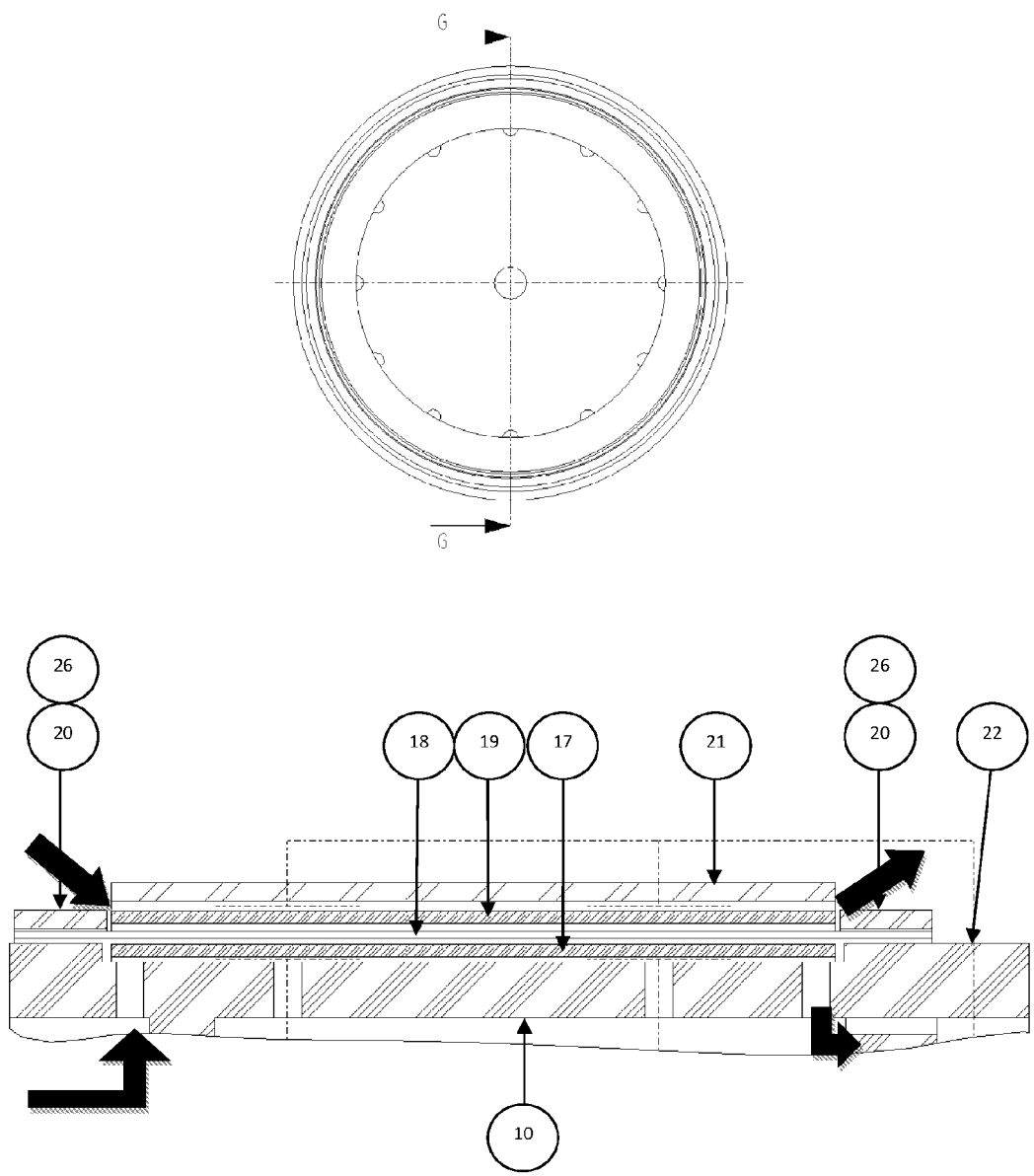
FIG. 9 is a generic top view of a cell of the invention, with a cross-section also shown.
Figure 10:
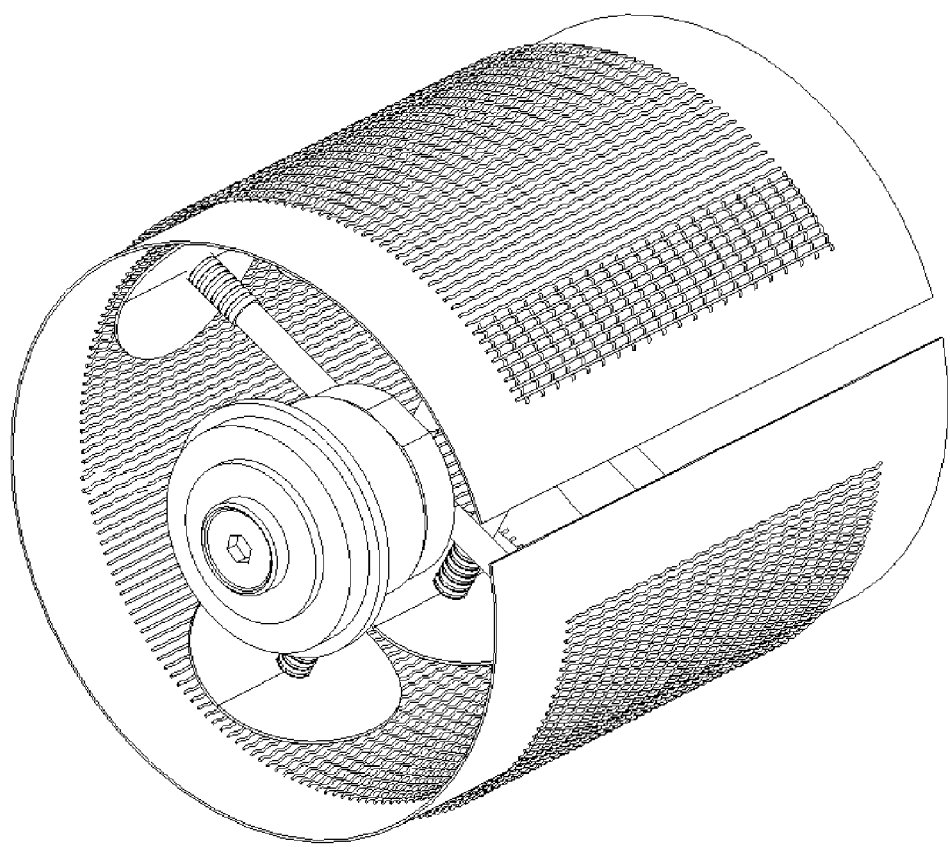
FIG. 10 is an isometric view showing an MEA of the invention, showing only the anode current routing solution (and not the cathode current routing solution).
Figure 11:
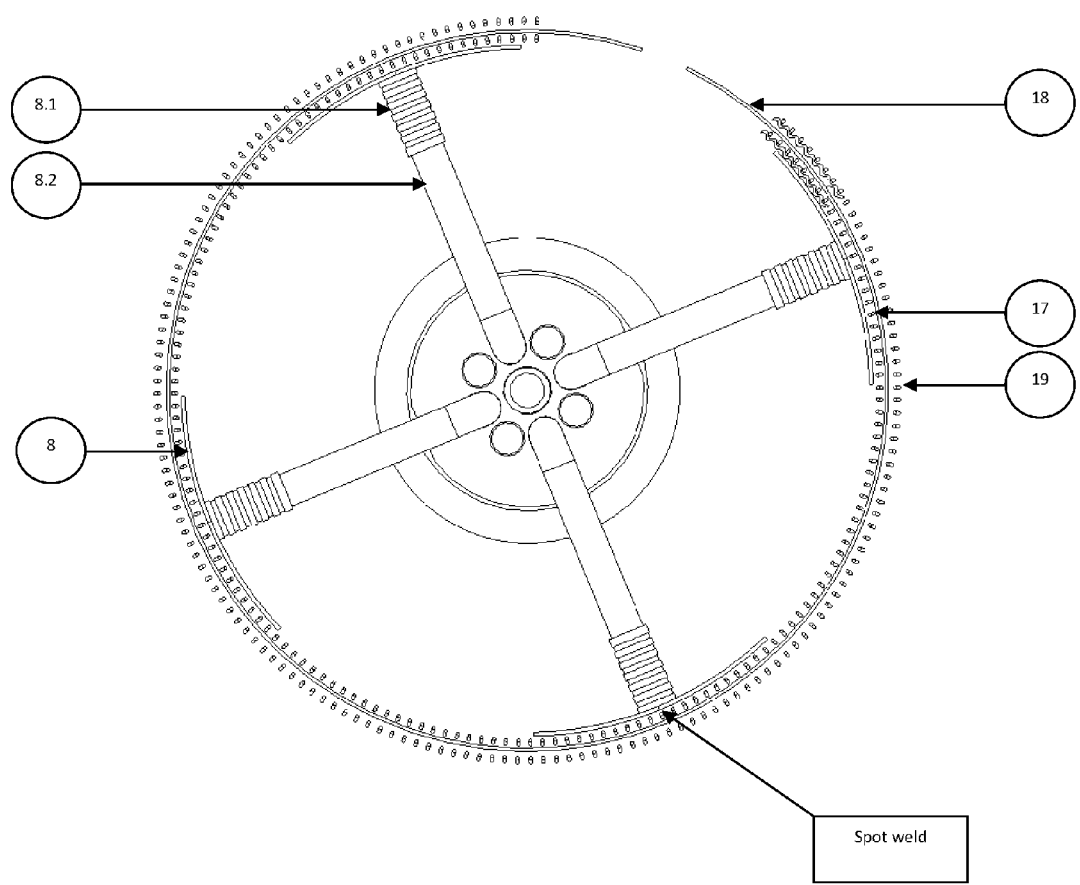
FIG. 11 is a top view of the MEA of FIG. 9, with anode current routing solution.
Figure 12:
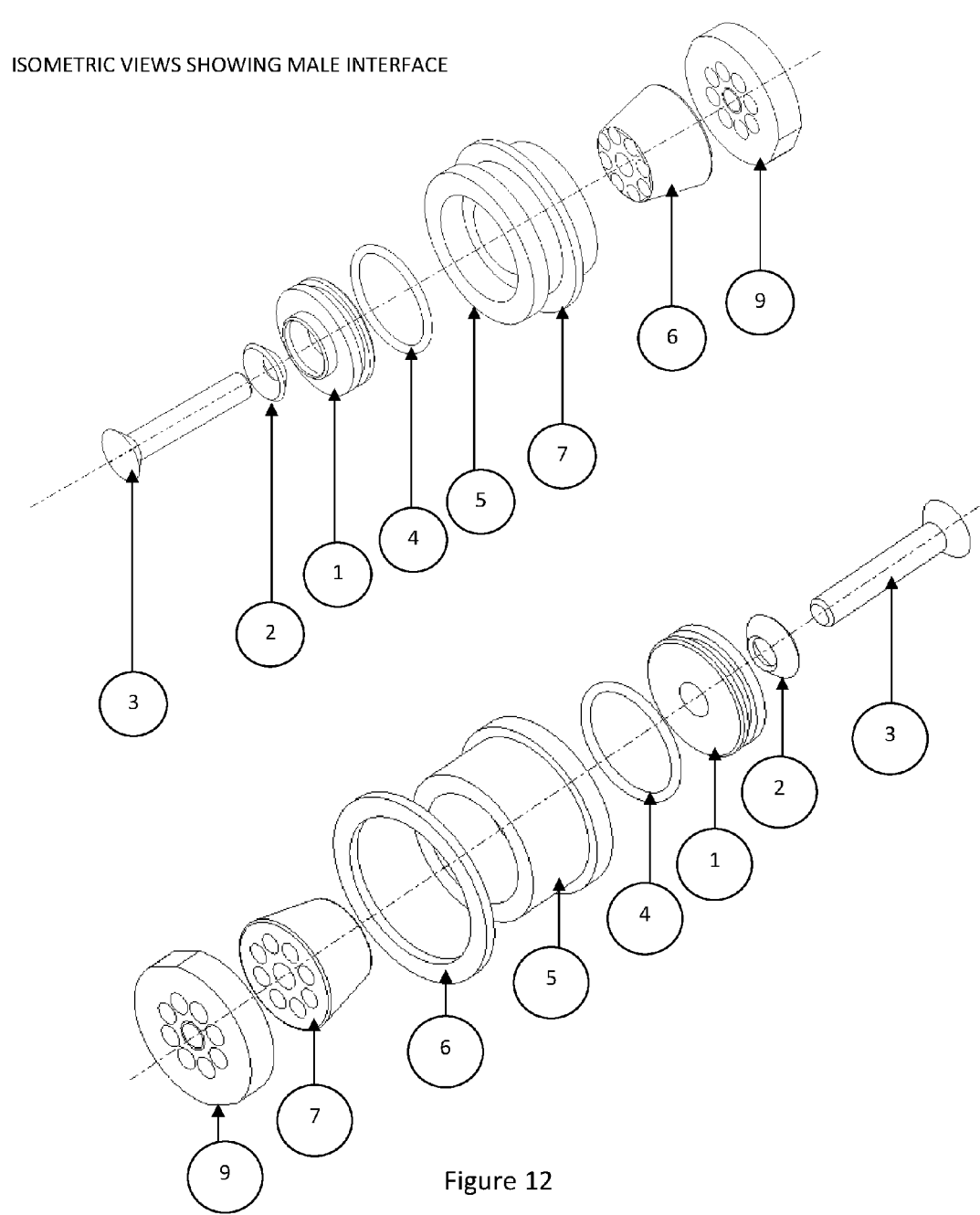
FIG. 12 is an isometric view of the male interface.
Figure 13:
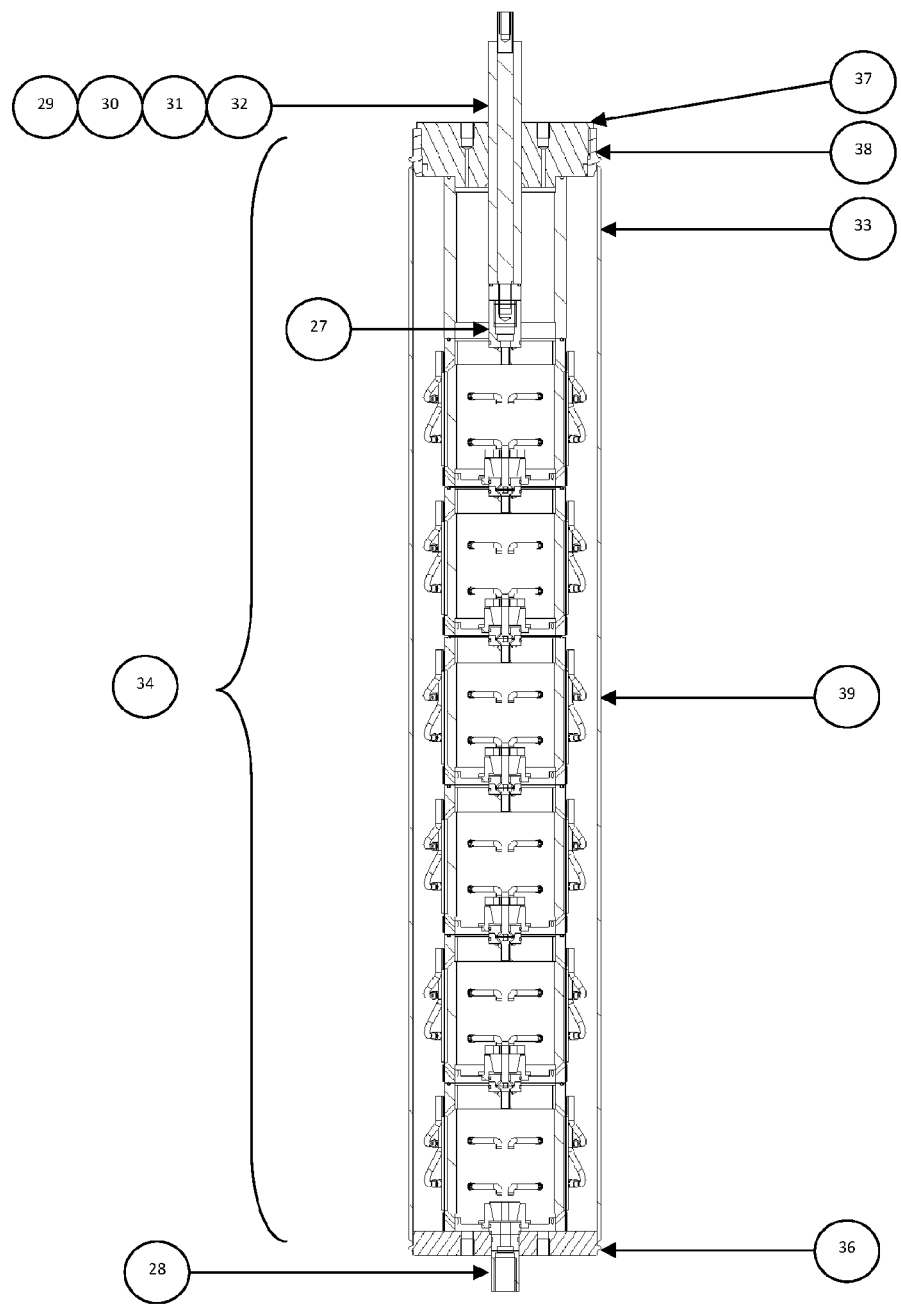
FIG. 13 is a 2-D representation of a co-axial stack of the invention in a tubular vessel.
Figure 14:
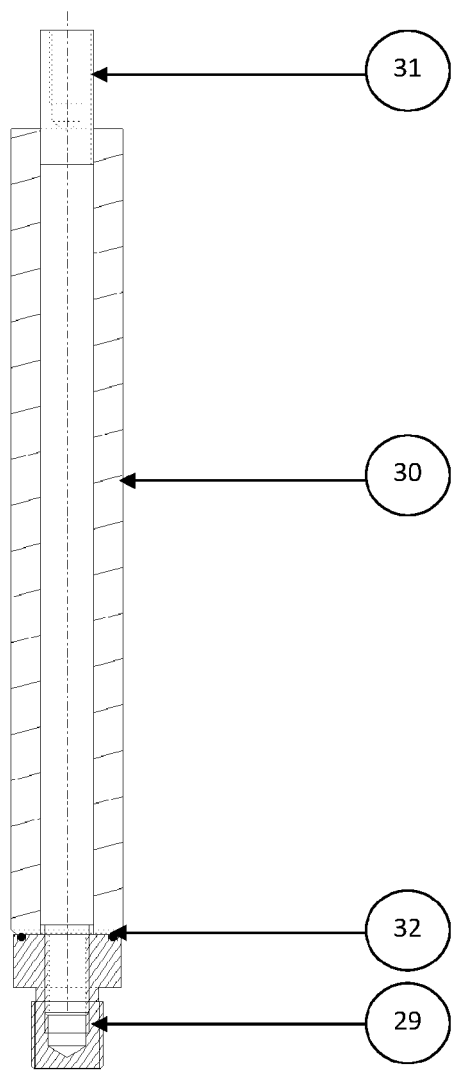
FIG. 14 shows the bus bar sub-assembly, used in a cell of the invention.
Figure 15:
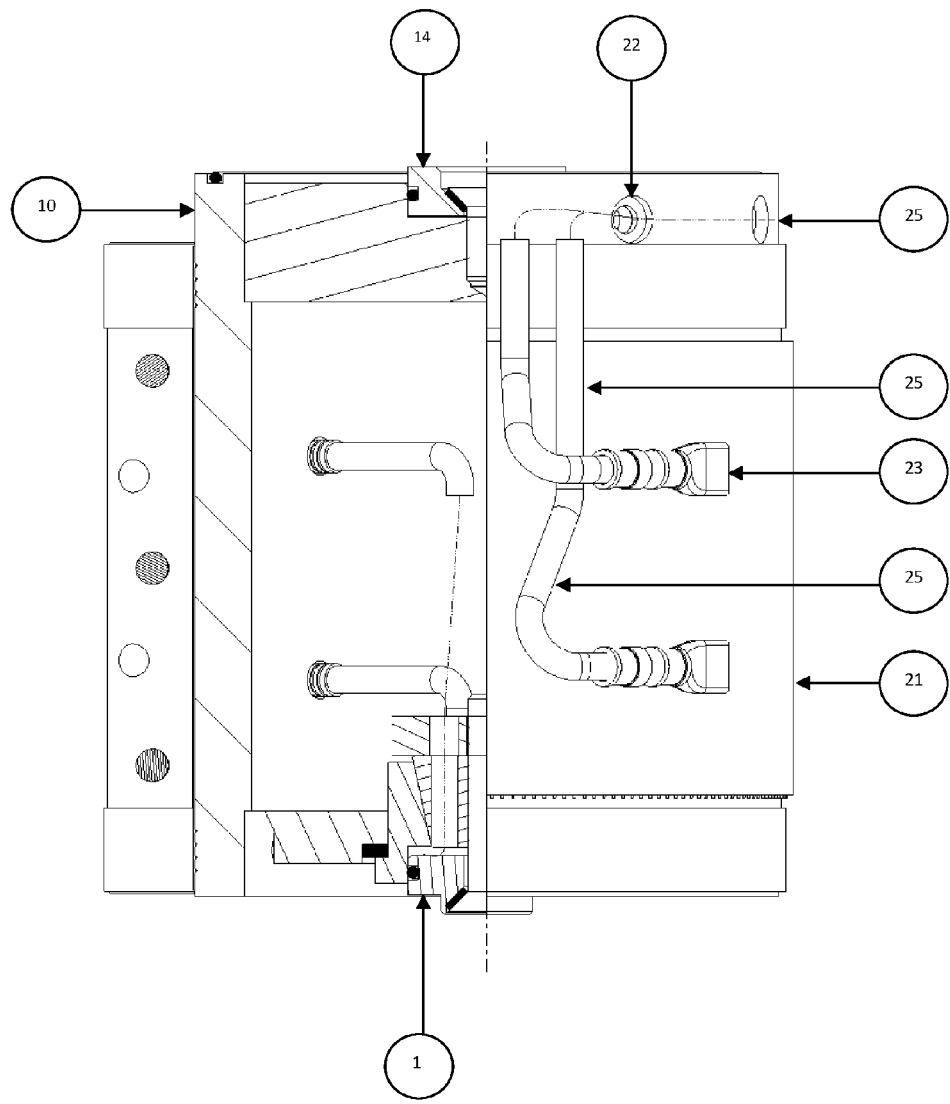
FIG. 15 is a half-section view of a cell of the invention.

As used herein, the term "tubular-shaped" is not restricted to components that form a cylinder with constant diameter, although that represents one possible embodiment. It is preferred that the tube is continuous, although anything more that about a semi-circle is included within the scope of the invention.

The term "tubular-shaped" also includes a slight conical-shape, i.e. with one end of the tube having a larger diameter than the other.

The layers of an MEA (or a cell) of the invention are substantially concentric. This means that they are substantially co-axial, or that the tubular layers are arranged so that one is inside the other, and so on.

A membrane suitable for use in the invention may be ionic or non-ionic. It is preferably ionic. The membrane may be acidic or alkaline.

A membrane suitable for use in the invention may act as a barrier membrane. A barrier membrane preferably comprises pores, which have a larger diameter than the ions to be exchanged in the electrochemical cell, i.e. those that are involved in the electrochemical reaction. The barrier membrane is preferably a microfiltration, gas separator, ultrafiltration, nanofiltration or a reverse osmosis membrane.

A non-ionic or a barrier membrane may be used in acid and alkaline systems. If it is used in an acidic system, then it is necessary to include an acid electrolyte.

Preferably, the membrane is ionic, i.e. an ion-exchange membrane. Preferably, the membrane is a hydrophilic polymer. The ion-exchange membrane may be cationic or anionic. In a preferred embodiment, the membrane is a hydrophilic cross linked ionic polymer, as described in WO03/023890.

The membrane may be formed from a conventional flat sheet, and then formed into a tubular-shape, or it may be cast as a cylindrical membrane. The preferred route is to cast complete MEAs or catalyst-coated membranes as detailed in the one-shot production processes in WO03/023890, thus providing intimate contact between the membrane and the catalyst, essential for good performance. The membrane may be made from a uniform material or may be a composite, as detailed in WO2007/105004.

In a preferred embodiment, flat sheet membrane materials may be curled around a core during the manufacture of a cylindrical electrochemical cell according to the invention.

The anode layer may be inside with respect to the cathode, as shown in the accompanying drawings. Alternatively the cathode layer may be inside with respect to the anode (particularly useful when high pressure oxygen is the desired product). For both acidic and alkaline cells, $H_2$ is produced at the cathode and $O_2$ is produced at the anode.

It is preferred that the cathode layer is an outer layer with respect to the anode.

Preferably, at least one of the electrodes is in the form of a mesh.

Preferably, the anode and/or the cathode may be coated with a suitable catalyst. Catalyst compositions are known in the art, and may be in the form of an ink.

An outer cylindrical sleeve surrounds a tubular MEA of the invention. The sleeve can preferably apply compressive forces to ensure that the layers of a cell of the invention are in contact. In a preferred embodiment, the sleeve is in the form of a clamp. Preferably, it comprises stainless steel. A sleeve of the invention may comprise shrink-tube wrapping or elastomeric rings, which can be expanded, slipped over the MEA, and released to exert a compressive force on the MEA.

In a preferred embodiment, the cylindrical core can exert pressure outwards to ensure that the layers of the cell are in contact. This may be achieved by expansion of the core in situ.

In a preferred embodiment, a tubular electrochemical cell of the invention is closed at each end by an interface endplate. The end plates fulfil critical flow management roles, as they contain apertures. The tubular cells can then be arranged into a stack (arranged end-to-end), such that they are electrically connected to one another via the interfaces (male and female). They may also be connected to each other via wires.

In a preferred embodiment, the electrochemical cell is an electrolyser. Alternatively, fuel cells, such as a hydrogen/oxygen fuel cell, are within the scope of the invention.

An aspect of the invention is a tubular vessel comprising a cell of the invention, or a stack of cells according to the invention. Preferably, the vessel is sealed and/or pressurised. The vessel may be transparent.

A tubular vessel of the invention may be made from a metal such as stainless steel. Preferably, it is made from 316L stainless steel.

In a preferred embodiment, a vessel of the invention comprises a region for gas storage. This removes the need for gas media separating towers in the balance of plant, which is explained in more detail below.

Preferably, the tubular vessel of the invention (containing a stack of cells) comprises a water-level sensor. When the tubular vessel of the invention contains an electrolyser, or a stack of electrolysers according to the invention, the tubular vessel may also comprise means for setting the water-level so that the uppermost cell in the stack is flooded (i.e. surrounded by water), but that there is also a region for gas at the top of the vessel. The region for gas preferably comprises separate regions/compartments for hydrogen and oxygen, corresponding to the relevant anode and cathode layers in the tubular electrolyser according to the invention. The amount of gas compared to the amount of water may be controlled separately on the hydrogen and oxygen sides. Component 33 in the accompanying drawings illustrates the gas head space.

In a tubular vessel according to the invention, which contains an electrolyser, there are essentially two concentric towers bounded by only one pressure vessel, each equipped with a water level sensor as described above to achieve gas/water separation. This translates into balance of plant savings (as in conventional electrolysers, two separate gas separation towers are required), and also reduces the amount of pressure bearing parts required (from three to one in the case of pressured oxygen, and two to one in the case of atmospheric oxygen).

In a tubular vessel of the invention, 'passive separation' or 'in situ' separation of water and gas is possible. This means that water and gas separation can be achieved without pumps (as is the case for the conventional planar electrolysers of the prior art). The vertical orientation of a tubular electrolyser of the invention, in use, is such that bubbles of gas will rise to the surface and come out of solution without any pumps being used to transfer the gas water mixture to separate towers for separation.

Preferably, the surface area of a tubular vessel of the invention has been maximised to aid heat extraction. The surface area may be maximised by adding "cooling fins" for heat extraction. The tubular vessel may also be insulated to prevent heat from escaping from the vessel. This may mitigate against intermittency of power supply, which usually occurs with coupling to renewable sources of power, such as photovoltaic or wind power.

A system akin to a 'thermal flywheel' may be used in conjunction with a cell/stack/vessel of the invention to store heat so that the system efficiency is boosted when it is restarted after an interruption due to intermittent renewable supply (wind or photovoltaic).

The tubular vessel may be provided separate from a cell of the invention. Alternatively, it may be integral with a cell of the invention.

A tubular vessel of the invention has benefits in terms of servicing the electrochemical cells, since one cell can be removed without affecting the contact pressures in the other cells.

When the electrochemical cell is an electrolyser, it may be dry on one side of the membrane or it may have water on both sides of the membrane. The use of the preferred materials, i.e. hydrophilic cross-linked polymers lends itself well to one-sided water operation, as detailed in WO2009/093042.

The anode and cathode may be at equal pressures. Alternatively, the cathode may be at a higher pressure than the anode, or the anode may be at a higher pressure than the cathode.

In a preferred embodiment, either the anode or the cathode (or both) can withstand pressures of greater than 30 bar. More preferably, either the anode or the cathode (or both) can withstand pressures of greater than 150 bar.

In the case of differential pressure between electrodes, it is preferred to have the higher pressure on the outside of the cylindrical, i.e. tubular cell, causing compression of the MEA onto the central supporting core. For cationic systems where high pressure hydrogen is the required output, the MEA would be ordered so that the anode was the internal surface and the cathode was the outer surface, if high pressure oxygen was required the reverse would be preferred.

Heat transfer may be achieved in a cell of the invention, by pumping water in a conventional sense, or passively by natural convection from each cell via the water and through the chamber walls to the external surroundings.

The inner core may be static, or it may be expanded in situ, in order to provide compressive force to the MEA.

In a preferred embodiment, a tubular vessel of the invention may be placed inside another vessel, and surrounded by a fluid to aid heat removal. The fluid may be used to 'store' the heat, for use elsewhere.

Preferred embodiments of the invention will now be described by reference to the accompanying drawings.

The drawings contain reference numbers corresponding to various components of an electrochemical cell of the invention. Those components corresponding to those reference numbers will now be described.

Component 1 is a titanium male plug interface, the face of which is an electrical contact. It is a current interface between modules, i.e. cells.

Component 2 is a pressure washer and a dielectric, which provides elasticity and resilience to avoid loosening of the electrical contact interface.

Component 3 is a fastener, which may be stainless steel. It is not part of the circuit. The fastener provides good tensile strength to effect sufficient contact pressure and desirable low resistance of the electrical contact interface.

Component 4 is an "O-ring", which prevents water reaching the back of component 1, where copper strands are trapped. Copper is preferable, as it is a good conductor.

Component 5 is an electrical pressure fitting housing, which is cone-shaped, and allows a seal to be formed with component 6. This may prevent the copper strands from contacting fluids.

Component 6 is a "male" cone, made of elastomeric material (polyurethane, for example).

Component 7 is an elastomeric ring, which allows the sub-assembly of components 1 to 6 to move within component 11, so as to produce a contact force that is ample, sustained, adjustable (in relation to shore hardness of the compound) and also provide correct mating plane orientation with adjoining female interface component 14.

Component 8 may be a set of 8 titanium discs (or contacting pads, the shape of which may be rectangular with one instance wrapped around the cylinder), with titanium wire crimps sub-assembly spot-welded on. The crimps are crimped on bare copper wire and a polyurethane-based compound may be used to each wire-to-crimp joint to prevent copper from becoming wet. On the other hand, the bare copper strands may be inserted within components 9 and 6, but left protruding slightly and then forced against the titanium plug interface (component 1) by the cone assembly (components 5 and 6). This may provide low-contact resistance which is desirable for high system efficiency.

Component 8.1 is the titanium crimps fitting to the end of the wire strands (8.2).

Component 8.2 is the electrical wires.

Component 9 is a stainless steel nut, which is combined with fastener (3). It can exert pressure on the elastomeric male cone (6) and allows wires through.

Components 10 are wires, which are fed through a tubular cartridge support structure (10). Hoop stresses are invoked when external pressure is acting, or an electrode jacket is pulled tight around it. This allows for the selection of cost-effective materials like a plastics material (for instance HDPE). This makes injection molding possible. The titanium discs are mounted flush with the cylinder surface.

Component 11 is a support ring for the male plug sub-assembly (1-9). It provides rigid support. The support ring also provides additional support under the membrane sleeve (20)

Component 12 is a support ring for the female plug (12). It allows cathode wire to be seated, trapped and compressed. The support ring also provides additional support under the membrane clamp (20).

Component 13 is an "O-ring", which can seal the wire strands from a wet environment.

Component 14 is a titanium female plug interface, the face of which is an electrical contact. The bore locates the spigot of component 1. This part is a current interface of the module, i.e. the cell. The whole interface can take the shape of a bolted interface, with component 1 being the screw, and component 14 being the threaded hole. The function of 14 is to provide sufficient contact pressure.

Component 15 is a pressure washer and a dielectric. It provides resilience and elasticity to avoid loosening of the electrical contact interface.

Component 16 is a screw, which provides tensile properties to effect high contact pressure and low contact resistivity on wire copper stands (25).

Component 17 is an anode mesh, which may include a catalyst, and which can be wrapped around component 10. It is preferred that the mesh layers are provided with increasing density towards the membrane. A semi circular or fully cylindrical, porous sinter (in the case of a fully cylindrical membrane) could be slipped over component 10.

Component 18 is a membrane. It may be semi-circular or fully, i.e. continuously cylindrical.

Components 19 are cathode meshes.

Component 20 is a membrane-sealing clamp arrangement, and comprises cylindrical sleeves and preferably longitudinal clamping bars. The longitudinal part of the clamp mitigates point- or line-loading on the membrane. Component 20 may be made of stainless steel or a high-grade polymer composite. The sleeve bands are typically stainless steel (or high-grade polymer composite) bands folded in a loop of the correct length and spot-welded or thermoplastically joined.

Component 21 is a stainless steel (or high-grade composite) cathode jacket. It is wrapped around the cathode meshes and catalyst. Component 20 is folded into a loop and spot-welded (or cured or bonded) and a tension bar is secured via screws to the longitudinal membrane sealing member (20). It uniformly applies compressive loading to the membrane electrode assembly arrangement, whilst invoking hoop stresses in the jacket (21). Relative slip of jacket and sub-layers is possible and desirable during the tensioning process. The tension achieved and the anchor (20) design, are determinant factors to obtain low-resistivity and sufficient contact pressure on the MEA. The cathode jacket may also be constructed from elastomeric rings, as described above.

Components 20 and 21 represent the "outer cylindrical sleeve".

Components 22 are "O-rings", and are slipped over each cathode wire at through-wall apertures, to obtain a seal. This embodiment may comprise a through-wall "bus bar", threaded at the end to allow connection of each of the wires.

Components 23 are cathode end wire crimps, and comprise stainless steel tubing, formed tightly on each wire to form a seal. They are then spot-welded to the jacket (21).

Component 24 is an "O-ring", which is located on the cartridge support structure (10), and which provides a seal between each module.

Components 25 are 40 Amperes rated wires, and are assembled to the crimps (23). Bare strands are squashed during the manufacture of component 23, and also provide the desired low resistivity.

Component 26 is a set of screws, to fasten the membrane clamp sealing arrangement.

Component 27 is a top adaptor bus bar.

Component 28 is a bottom adaptor.

Component 29 is a bus bar connector.

Component 30 is a bus bar insulation.

Component 31 is a bus bar copper core.

Component 32 is a bus bar "O-ring".

Component 33 is a top spacer.

Component 34 is a vessel.

Component 35 is a welding boss.

Component 36 is a flat-end.

Component 37 is a screw able end-cap.

Component 38 is an end cap (female).

Component 39 is a shell tube embodiment (which may be stainless steel, stainless steel with composite or clear polycarbonate for low pressure and aesthetic).

There are many advantages associated with a tubular MEA/electrochemical cell of the invention, in terms of stresses on the MEA, ease of manufacture, heat extraction and ease of serviceability. These are detailed below.

Stresses

In a preferred embodiment of the invention, there is slightly more pressurised gas in the outside chamber compared to the inside chamber. In this context, compressive hoop stresses are primarily invoked in support component 10, i.e. the cylindrical core. This item can be made out of a cost-effective commodity plastic without compromising the contact pressure within the MEA. In other words, the support doesn't 'cave-in' easily, even though it is made out of a relatively weak plastic.

Due to the fact that there are no bending stresses invoked in a cell of the invention, the overall dry weight is very favourable compared to a planar electrolyser, whilst contact pressure in the MEA is increased with pressurised gas in the outside chamber.

The stresses invoked in the outer cylindrical sleeve (compounds 20 and 21) are primarily tensile hoop stresses. Component 21 is central as it conveys the compressive loading on the MEA, which is a desirable feature. This is achieved with a degree of elasticity, which can be increased with the addition of Belleville washers or elastomeric rings, as described above.

Component 21 may be a stainless steel or a composite material compatible with the environment. Thin rectangular slots may be cut through the jacket, and a wrapped current collector (with current strips spot-welded onto it) may be fed through the slots. A bar fastened or spot-welded to the strips would ensure through-wall routing of current to the female plug (14). This would alleviate the need for wires (25) and crimps (23), and may reduce weight and number of parts.

Component 7, the polyurethane or elastomeric ring, allows the contact force on the interface between modules (1 and 14) to be controlled, as well as the plane of orientation of the whole male plug assembly (1-6 and 9), to ensure perfect mating with component 14. The shore hardness of the compound used, as well as the diameter and thickness for this part, are central to achieve this control. The preferred embodiment uses a shore hardness of 80 shore A.

Components 1, 5 and 6 are tightened together, and allow a considerable amount of compression of the wires, in a compact space and with only one fastener. This is a central consideration when considering ease of assembly and scale-up of manufacture.

Manufacture

A number of the components may be fabricated using spot-welded joints, which confers cost effective, low-skilled assembly and low resistivity of contacts (as materials are fused together).

Heat Extraction

Heat extraction (due to inefficiencies) is encouraged by more radiation; unlike the planar system, all the heat generating elements are not adjacent and separated by small distances. In the tubular vessel of the invention, all the heat generating surfaces, i.e. the MEA, are physically close to the outer surface of the tube.

The plurality of openings per cell is greater than for a conventional planar electrolyser of the same surface area. This allows greater heat extraction. Again, there is little to no detriment to the structural integrity of the tube cartridge (10), as the stresses invoked are compressive hoop stresses.

The above consideration means that the vessel material can be tailored for passive cooling (for example by increasing its surface area with the addition of fins), and this allows considerable reduction in balance of plant and parasitic load, due to the removal of pumps. Integrated gas separation (in headspace around and within 33) means that substantial cost savings can be made. This heat may also be transferred to another fluid for use or rejection by placing the tubular device inside another fluid-filled vessel.

Alternatively, the tubular vessel may be constricted for the reduction of the thermal transmission, by selecting appropriate materials that will be known to those skilled in the art. As discussed above, the heat may be stored to maximise subsequent efficiency or as a defense against low temperatures.

The separation or gas store region (around and within 33) can be fitted with check valves to mark the vessel separation between the electrolysis side and the separation/buffer/storage side.

Pressure Containment/Ease of Servicing

The electrochemical cells of the invention can be stacked within a tubular vessel. A wide number of materials are suitable for the manufacture of the tubular vessel, depending on the pressure required. This allows for considerable cost savings.

The tubular vessel could be made from a clear plastics material; this may be aesthetically pleasing.

The unique modular approach of a co-axial stack of the invention allows for the removal of one end cap (37) in order to access all cells in the tube, which allows for the implementation of efficient service strategies. Current planar electrolysers have a plurality of nuts and tie-rods rendering them impractical to service, or meaning that an excessive amount of capital has to be immobilized for longer when servicing is required.

Such independence of cells and modularity offers a greater flexibility in the manufacture and utilization (including servicing) of electrolysers than the planar system of the prior art. In fact, the whole manufacturing benefits.

The following Examples illustrate the invention.

Example 1

A tubular cell was made according to FIG. 1, and using the following components:

Coaxial/tubular electrolyser running in a tower of water, without cooling water

Anode: 1 micron Pt on Ti

Cathode: Ni Cr

Membrane material: Cationic hydrophilic ionic polymer membrane coated with 1 mg Pt/cm$^2$ per side.

Hydrated in the device

Active area: 137 cm$^2$-141 cm$^2$

Membrane thickness: 0.4-0.45 mm

Torque on active area tightening screws 3 Nm

No cooling water circulated

Temperature: 25 to 28° C.

The device was run successfully as an electrolyser up to 1 A/cm$^2$.

Example 2

Current density was plotted against voltage for an evaluation test electrolyser cell according to the invention (9 cm$^2$) and a coaxial stack of electrolyser cells according to the invention (175 cm$^2$). The plots were almost identical, showing that electrical resistive losses associated with the higher current in stacks are negligible. Additionally, the additional connections in the stack do not cause problematic voltage rise. This also proves the ability to maintain good appropriate and even contact pressure across the surface of the MEA, this homogenous pressure ability is backed up by pressure sensitive paper testing.

Example 3

A 5-cell electrolyser stack according to the invention was constructed, with an active area of 150 cm$^2$, an anode of 1 μm pt on Ti, a cathode of Ni Cr, and a hydrophilic polymeric membrane of thickness 0.6 mm.

A graph was plotted of cell position vs voltage and it was found that there was no detrimental voltage rise linked to cartridge position.

Example 4

A tubular electrolyser stack and a planar electrolyser stack of equivalent capacity and performance were weighted (dry), in order to assess the efficiency of their use of construction materials.

The tubular electrolyser weighed 13.2 kg, whereas the planar electrolyser weighed 49.6 kg. Therefore an electrolyser of the invention has much improved efficiency in terms of construction materials usage. It is therefore cheaper to manufacture cells of the invention, compared to conventional planar cells.

The invention claimed is:

1. A tubular vessel, comprising an electrolyser or a stack thereof, wherein the electrolyser comprises the following layers which are tubular-shaped, arranged substantially concentrically, and listed from the inner layer to the outer layer;
    (i) a cylindrical core;
    (ii) a first electrode;
    (iii) a membrane;
    (iv) a second electrode; and
    (v) an outer cylindrical sleeve,
    wherein the first electrode is in direct contact with the cylindrical core and the membrane, the membrane is in direct contact with the first electrode and the second electrode, and the second electrode is in direct contact with the membrane and the outer cylindrical sleeve, and
    wherein the outer cylindrical sleeve is a clamp, a shrink-wrap tube, or a plurality of elastomeric rings that provides compressive force.

2. The tubular vessel according to claim 1, wherein the outer cylindrical sleeve applies a compressive force to ensure that the layers are in contact.

3. The tubular vessel according to claim 1, wherein the cylindrical core exerts pressure outwards to ensure that the layers are in contact.

4. The tubular vessel according to claim 1, wherein the first electrode and the second electrode are at different pressures.

5. The tubular vessel according to claim 1, wherein the outer cylindrical sleeve is clamped around layers (ii) to (iv).

6. The tubular vessel according to claim 1, wherein the cylindrical sleeve comprises stainless steel.

7. The tubular vessel according to claim 1, wherein the tubular-shaped electrolyser formed by layers (i) to (v) is closed at each end by an interface, and wherein each interface comprises means for putting the electrolyser into electrical contact with another similar electrolyser.

8. The tubular vessel according to claim 1, comprising a stack of tubular-shaped electrolysers, wherein each electrolyser is closed at each end by an interface, wherein each interface comprises means for putting the electrolyser into electrical contact with an adjacent electrolyser of the stack, and wherein the electrolysers are arranged end-to-end, such that they are connected via the interfaces.

9. The tubular vessel according to claim 1, which contains a region for gas storage.

10. The tubular vessel according to claim 1, wherein the surface area of the vessel has been maximised to increase heat transfer.

11. The tubular vessel according to claim 1, wherein the first electrode is an anode and the second electrode is a cathode.

12. The tubular vessel according to claim 1, wherein at least one of the electrodes is coated with a catalyst.

13. The tubular vessel according to claim 1, wherein at least one of the first electrode and the second electrode is a mesh.

14. The tubular vessel according to claim 1, wherein the outer cylindrical sleeve is a clamp.

15. The tubular vessel according to claim 14, wherein the clamp is clamped around layers (ii) to (iv).

16. The tubular vessel according to claim 1, wherein the outer cylindrical sleeve is a shrink-wrap tube.

17. The tubular vessel according to claim 1, wherein the outer cylindrical sleeve is a plurality of elastomeric rings.

18. A method of performing an electrochemical reaction involving a liquid and a gas, using a tubular vessel according to claim 1, wherein the liquid and gas are separated passively within the tubular vessel, such that no additional gas/liquid separation tower is needed in order to perform the electrochemical reaction, and
wherein the method further comprises applying pressure to the tubular vessel such that a pressure applied to the second electrode is higher than a pressure applied to the first electrode.

* * * * *